United States Patent [19]

Morales

[11] Patent Number: 5,285,812
[45] Date of Patent: Feb. 15, 1994

[54] JET LEVEL SENSOR FOR FUEL TANKS

[75] Inventor: Gerald A. Morales, Simi Valley, Calif.

[73] Assignee: HR Textron, Inc., Valencia, Calif.

[21] Appl. No.: 942,551

[22] Filed: Sep. 9, 1992

[51] Int. Cl.[5] .................. F15C 1/14; F16K 21/18
[52] U.S. Cl. ............................. 137/393; 73/290 R; 137/386; 137/842; 141/198
[58] Field of Search .................. 137/386, 393, 842; 141/198; 73/290 R, 548

[56] References Cited

U.S. PATENT DOCUMENTS

| | | | |
|---|---|---|---|
| 3,174,503 | 3/1965 | Absolon | 137/393 |
| 3,269,404 | 8/1966 | Lebow | 137/393 |
| 3,406,709 | 10/1968 | Elbogen et al. | 137/389 |
| 3,561,465 | 2/1971 | de Graaf | 137/386 |
| 3,703,907 | 11/1972 | Richards | 137/386 |
| 3,817,246 | 6/1974 | Weigl | 137/842 |
| 4,006,762 | 2/1977 | Badger | 137/386 |
| 4,024,887 | 5/1977 | McGregor | 137/386 |
| 4,161,188 | 7/1979 | Jorgensen | 137/393 |
| 4,202,367 | 5/1980 | Roth et al. | 137/393 |
| 4,211,249 | 7/1980 | Richards | 137/386 |
| 4,312,373 | 1/1982 | Tilling et al. | 137/393 |
| 4,345,618 | 8/1982 | Altman et al. | 137/393 |
| 4,515,178 | 5/1985 | Campau | 137/393 |

*Primary Examiner*—George L. Walton
*Attorney, Agent, or Firm*—Robbins, Berliner & Carson

[57] ABSTRACT

A jet level sensor used for controlling the liquid level in a tank such as a fuel tank. The sensor includes a nozzle and receiver supported within a bracket so that the nozzle and receiver and the associated conduits are freely rotatable with respect to the bracket. A manifold is coupled to the receiver for providing a plurality of output pressure signals indicative of the liquid level within the tank. The sensor is connected to a system which includes a main inlet valve and redundant relay valves which are fluid pressure responsive and which shut off responsive to the absence of a pressure signal from the sensor when the liquid within the tank reaches a predetermined desired level. Also provided are shut-off valves connected to be responsive to a tank and nozzle failure over-pressure condition at the inlet or within the tank.

10 Claims, 3 Drawing Sheets

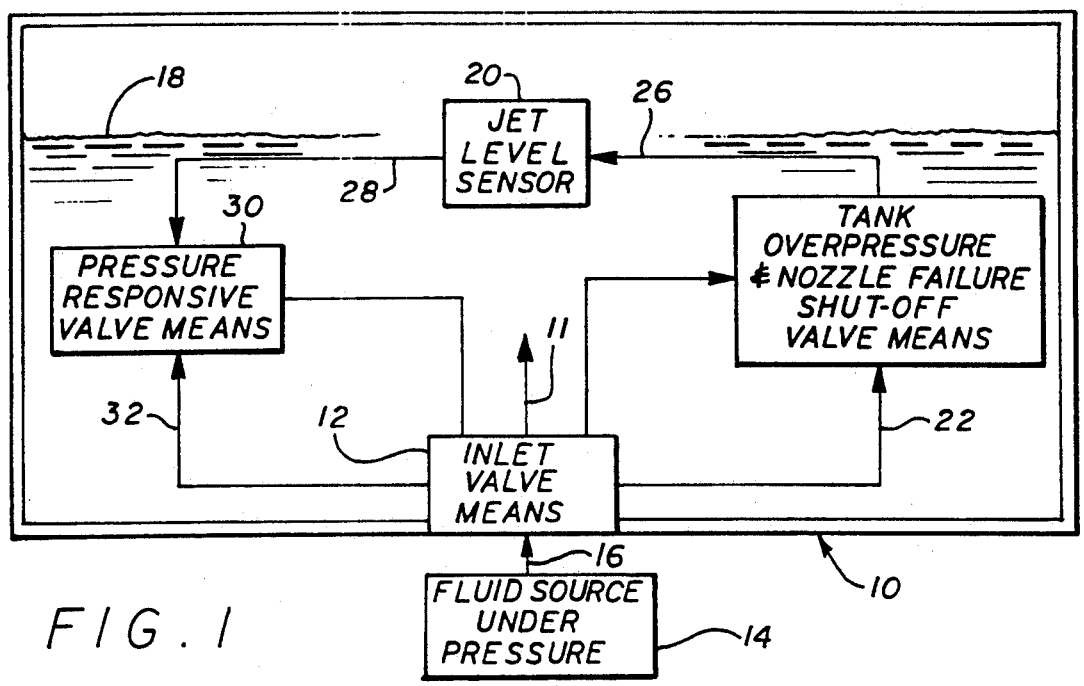
FIG. 1
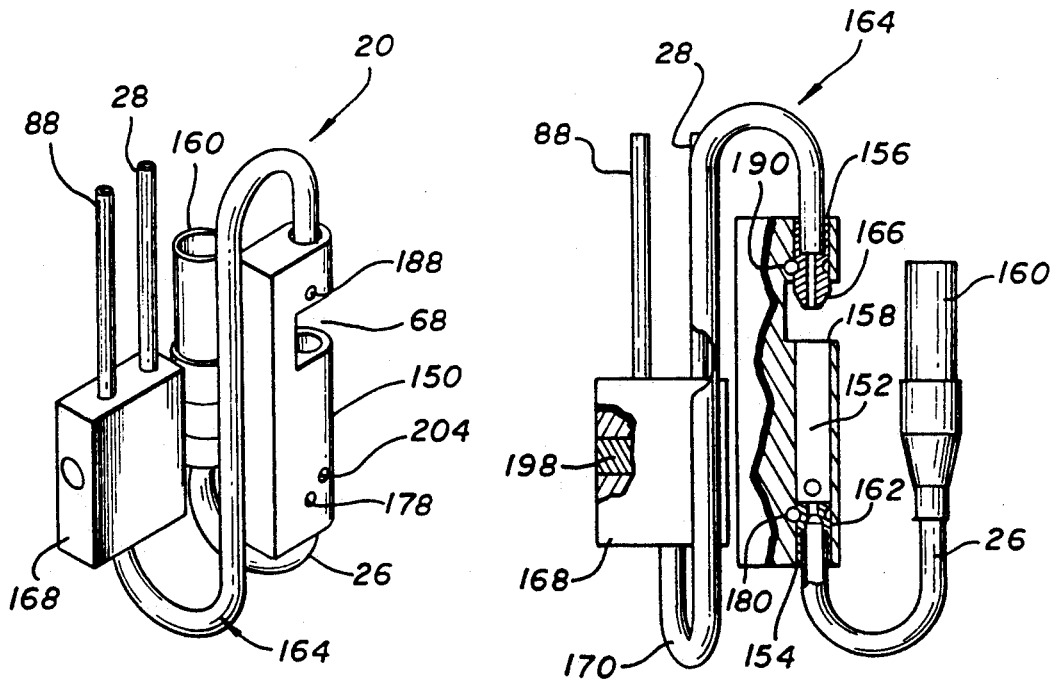
FIG. 3
FIG. 4

JET LEVEL SENSOR FOR FUEL TANKS

BACKGROUND OF THE INVENTION

1. Field of the Invention

The present invention is directed generally to controlling the level of liquids particularly in fuel tanks and more specifically to a jet level sensor useful for detecting the liquid level in such fuel tanks.

2. Background of the Invention

It has long been desirable to control the level of liquid particularly in fuel tanks normally incorporated in aircraft. Such automatic level control systems normally will preclude overflow of the fuel tank with all of the attendant disadvantages thereof such as fire hazard, wasted fuel, bad odors and the like. Various types of systems have been developed to accomplish the desired level control such as traditional float operated mechanisms or jet level sensor systems or diaphragm operated valve systems. The present invention is directed specifically to jet level sensor systems and more particularly to the jet level sensor. Typical level control systems known to Applicant which employ jet level sensors are exemplified by U.S. Pat. Nos. 4,211,249; 3,269,404; 3,406,709; 4,312,373; 4,202,367; 4,161,188; 4,024,887; 3,817,246; 3,561,465; and 4,006,762. The present invention is an improvement over the system disclosed in U.S. Pat. No. 4,006,762 and the disclosure of U.S. Pat. No. 4,006,762 is incorporated herein by reference.

Jet level sensor control systems utilized in the prior art as exemplified by the above-identified patents have generally been satisfactory. However, some difficulties have been encountered whether the system uses single or dual jets for liquid sensing. Some of the difficulties encountered are (1) that the fuel in the tank will splash as the level thereof is increased and will sometimes interrupt the liquid jet in the jet level sensor thereby causing a condition of on-off, on-off indicators, sometimes referred to as "milking" until the fuel in the tank has reached the desired level, (2) that the recovery of the pressure present in the liquid jet is, in some instances, quite low resulting in unreliable operation of the sensing, and (3) that many of the prior art jet level sensors are rather complex and thus are expensive to manufacture and to maintain.

SUMMARY OF THE INVENTION

There is provided a jet level sensor for detecting the level of liquid in a tank which includes a nozzle and receiver disposed within a bracket means with the orifices of the nozzle and the receiver axially aligned. The orifices of the nozzle and receiver are sized in such a way that the jet liquid stream emanating from the nozzle fully engulfs the receiver orifice. A manifold is coupled to the receiver and a plurality of conduit means are coupled to the manifold to provide a plurality of output pressure signals from the sensor indicative of the liquid level in the tank.

BRIEF DESCRIPTION OF THE DRAWINGS

FIG. 1 is a schematic diagram in block form illustrative of a liquid level control system incorporating a jet level sensor in accordance with the present invention;

FIG. 3 is an isometric illustration of the jet level sensor in accordance with the present invention;

FIG. 4 is a plan view partly in cross section of the assembled jet level sensor as illustrated in FIG. 3;

DESCRIPTION OF THE PREFERRED EMBODIMENT

Figure 2:
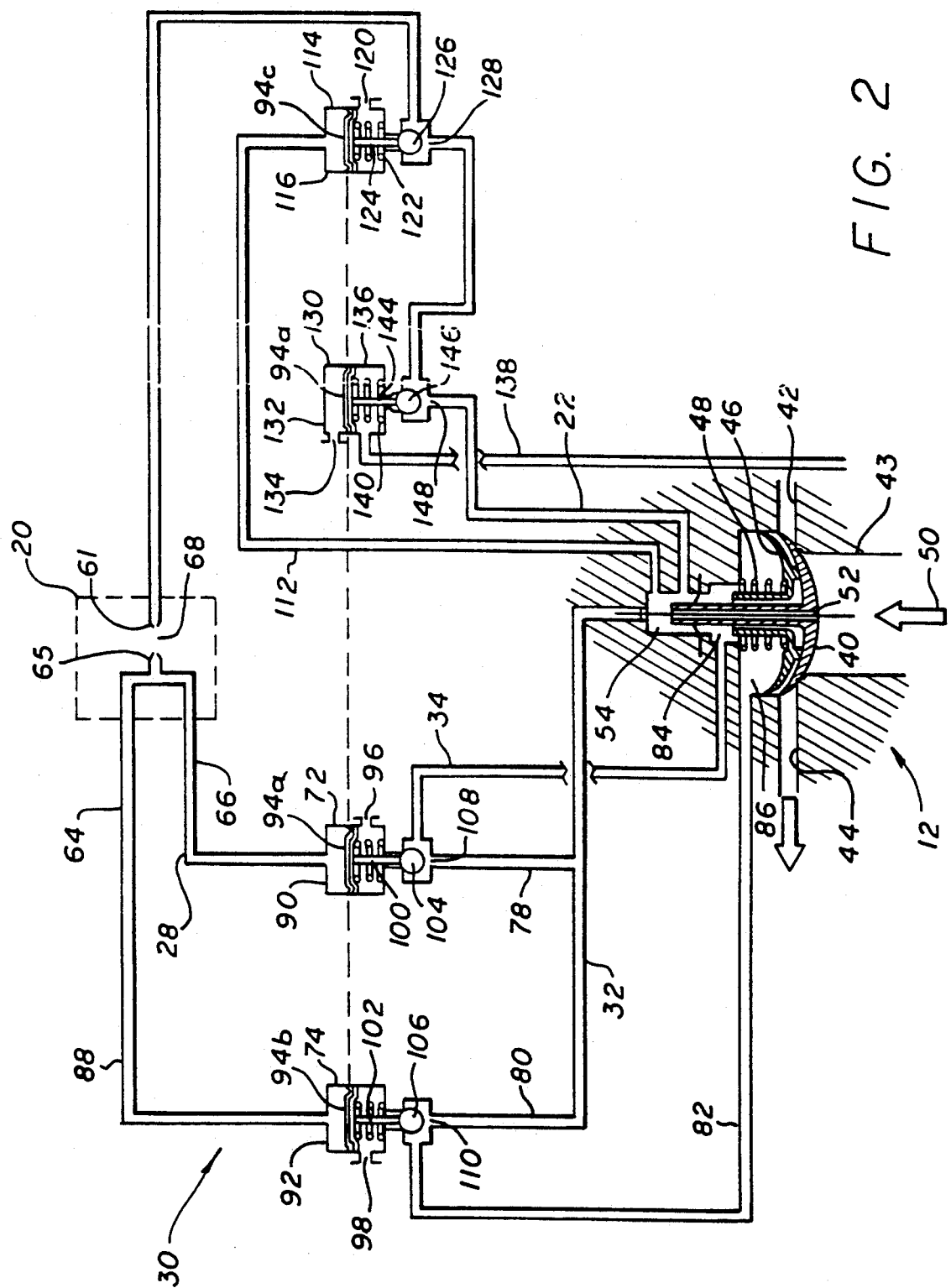
FIG. 2 is a schematic diagram showing the system of FIG. 1 in further detail.

Referring to FIG. 1, there is generally shown a system for using the jet level sensor constructed in accordance with the present invention. The system is housed within a tank 10 which has an inlet valve means 12 associated therewith. A source of fluid under pressure 14 such as gasoline is connected as is indicated by the conduit 16 to the inlet valve means to refuel or refill the tank 10 as is well known. Under typical operation, the fuel flows through the inlet valve means 12 and into the interior of the tank 10 as shown by the arrow 11 for such a time as required to reach a pre-determined level within the tank such as shown at 18. A jet level sensor means 20 is operative to detect the moment when the fuel level reaches the desired position 18 within the tank and to effect closure of the inlet valve 12 in response thereto.

The source of fluid for operation of the jet level sensor 20 is obtained from the inlet valve means 12 by means of the connection 22 through the tank over-pressure and nozzle failure shut-off valve means 24 and the connection 26 to the jet level sensor 20. So long as the level of fuel within the tank is below the desired level 18 fluid flows from the inlet to the outlet of the jet level sensor 20 and produces a pressure signal which is supplied through the connection 28 to a pressure-responsive valve means 30. The valve means 30 is operative to maintain the inlet valve means in an open condition so long as the jet level sensor 20 is operative with a pressure signal in the conduit 28.

When the level of fuel reaches the desired level 18 in the tank 10 the flow of liquid between the inlet and outlet of the jet level sensor 20 is interrupted thus interrupting the pressure signal present in the conduit 28. When such signal is no longer present, the inlet valve means 12 closes thus shutting off the flow of fluid from the source 14 into the tank 10. Such closing of the inlet valve means 12 is accomplished by the provision of a pressure signal from the inlet valve means 12 over the conduit 32 through the pressure-responsive valve means 30 and the conduit 34 to the inlet valve means 12.

Referring no more particularly to FIG. 2, the level control system of FIG. 1 is schematically illustrated but in greater detail than is the case with respect to FIG. 1. As is illustrated in FIG. 2, the inlet valve 12 includes a primary shut-off poppet 40 which cooperates with a seat 42 formed in a base 43 to thereby close the inlet valve and block the flow of fluid therethrough and into the tank 10 by way of the outlet 44. Cooperating with the primary shut-off poppet 40 is a secondary shut-off poppet 46. A spring means 48 continuously urges the inlet valve shut-off poppets toward the closed position as illustrated in FIG. 2. The fuel is supplied from the source 14 and typically from a nozzle to the inlet as is illustrated by the arrow 50 and is as well understood in the prior art.

The primary poppet 40 defines an opening 52 axially thereof and through which fluid is permitted to flow.

The fluid flowing through the opening 52 enters the chamber 54 which is isolated from the primary and secondary position chambers by a dynamic seal, and from there is fed to the jet level sensor and relay valves for operation of the inlet valve 12 as will be more fully described hereinbelow.

As fluid flows through the conduits 22-26, it enters the inlet 60 of the jet level sensor 20. A bifurcated outlet 64-66 is also provided. Thus, there is provided a single jet ejector 61 and a single jet receiver 65 in the jet level sensor 20. The jet receiver 65 branches into the bifurcated outlet 64-66 by way of a manifold as will be described more fully below. The space between the jet ejector and the receiver as illustrated at 68 is open to the interior of the tank 10. When the liquid level within the tank fills the space 68, fluid is no longer capable of flowing between the ejector 61 and the receiver 65 of the jet level sensor 20. In this fashion, the sensor 20 detects when the fluid within the tank has reached the pre-determined desired level.

When there is no fluid flow into the jet receiver 65 of the fluid level sensor 20, there is no pressure signal and the pressure-responsive valve means 30 is in the position as illustrated in FIG. 2. In the preferred embodiment the valve 30 constitutes a primary and secondary relay 72 and 74, respectively. Under these conditions fluid under pressure in the chamber 54 passes through the conduit 32 to the relays 72 and 74. The fluid under pressure in the conduit 32 flows through the conduits 78 and 80 and through the relays 72 and 74 and then through the conduits 34 and 82 to the primary and secondary piston chambers 84 and 86, respectively. The pressures appearing in the chambers 84 and 86 provide a force on the primary and secondary shut-off poppets 40 and 46 causing them to move toward the closed position as illustrated in FIG. 2. At the normal operating pressures of the system and with the sizing of the poppets 40-46, sufficient force is generated by pressure appearing in either chamber 84 or 86 to effect closure of the inlet valve 12. Thus, a redundancy is provided to protect against inadvertent failure of one of the relays for any reason.

When fluid is flowing through the jet sensor means 20 in an uninterrupted fashion, a pressure signal appears in the conduits 28 and 88. This pressure signal is present in the chambers 90 and 92 of the relays 72 and 74, respectively. The pressure appearing in the chamber 90 creates a differential pressure across the diaphragm 94a therein as does the pressure in the chamber 92 across the diaphragm 94b in the relay 74. The opposite side of the diaphragm in each case is vented to the interior of the tank as illustrated by the openings 96 and 98. Differential pressure thus causes the pistons 100 and 102 in the relays 72 and 74, respectively, to move downwardly, as viewed in FIG. 2, thus moving the ball valves 104 and 106, respectively, to close the ports 108 and 110, respectively. With the ports 108 and 110 closed, the fluid pressure signal appearing in the conduit 32 is removed from the chambers 84 and 86. As a result, the fluid pressure from the source 14 operates upon the inlet surface of the primary shut-off poppet causing it to move against the force of the spring 48, upwardly as viewed in FIG. 2 thereby allowing the fuel to flow through the outlet 44 into the tank.

In the event the fuel pressure at the inlet or from the source 14 becomes too great such that damage could be done to the fuel control apparatus or to the tank, means is provided to shut off the inlet valve means thereby protecting the system. Conduit means 112 is connected to a nozzle over-pressure shut-off valve 114 which includes a chamber 116 with a diaphragm 94c exposed thereto. The opposite side of the diaphragm 94c is vented to tank as shown by the opening 120. Spring means 122 maintains a piston 124 in the position illustrated in FIG. 2 so that pressure within conduit 22 maintains a ball valve 126 in the position shown. While in this position fluid may flow through the conduit 26 to the jet level sensor 20 as above described. However, in the event the nozzle pressure becomes too large, and above that established by the spring force of the spring 122, the pressure appearing in the chamber 116 of the shut-off valve 114 moves the piston 124 downwardly, as viewed in FIG. 2, thus placing the ball valve so as to block the port 128 thereby precluding the flow of fluid to the jet level sensor 20. When such occurs the ball valves 104 and 106 return to the position illustrated in FIG. 2 thereby immediately causing the primary and secondary shut-off poppets to move to the closed position as illustrated in FIG. 2 and as above described. So long as the nozzle pressure remains in excess of that desired, the nozzle over-pressure shut-off valve 114 will remain operated thereby precluding further entry of fuel into the tank.

Under certain circumstances, the pressure present internally of the fuel tank will become great enough potentially to rupture the tank. Under these circumstances provisions need to be made to preclude further flow of fuel into the fuel tank. To provide such protection there is provided a tank over-pressure shut-off valve 130. Valve 130 is constructed as is the valve 114 except that the chamber 132 thereof is vented to the tank as is illustrated at 134 with the opposite chamber 136 being vented to atmosphere through the conduit 138. When the pressure in chamber 134 exceeds a predetermined designed pressure as established by the spring 140, the differential pressure across the diaphragm 94d moves the piston 144 downwardly, as viewed in FIG. 2, thus causing the ball valve 146 to close the port 148 thereby interrupting the flow of fluid through the conduit 22 and to the jet level sensor 20. Again so long as the tank pressure exceeds the predetermined design limit the ball valve 146 remains in the closed position thus precluding all leakage of fluid into the tank through the jet 61.

The diaphragms 94a, 94b, 94c and 94d are all formed of the same unitary diaphragm member as is shown by the dashed lines interconnecting the same. As will further be noted and hereinafter more fully described, the various valves utilized to control the position of the inlet valve means are constructed by molded plastic members stacked one on the other, and the diaphragm is secured between these plates. Different pressure signals may be applied to pre-selected portions thereof to accomplish the operation as above described.

The construction of the various portions of the system as illustrated in FIG. 2 except for the jet level sensor 20 is disclosed in detail in U.S. Pat. No. 4,006,762, incorporated herein by reference and, therefore, no additional detailed description thereof will be provided herein.

Referring now more specifically to FIGS. 3 and 4, the jet level sensor 20 is illustrated in detail. As is therein shown, the jet level sensor 20 includes a bracket 150 which defines a bore 152 therethrough. The bore 152 has a first end 154 and a second end 156. The bore 152 is also interrupted as shown at 158 between its ends 154 and 156 to provide the space 68 between the jet ejector 61 and the jet receiver 65 for exposure to the liquid level in the tank.

An inlet tube assembly 160 having a nozzle 162 affixed to the conduit 26 thereof is provided. The nozzle is received in the first end 154 of the bore 152. An outlet tube assembly 164 including a receiver 166 affixed thereto is received within the second end 156 of the bore 152. A manifold 168 is coupled to the receiver 166 by the conduit 170. The conduits 28 and 88 are coupled to the outlet of the manifold 168 to provide a plurality of pressure signals, for example as may be connected to the primary and secondary relays 72 and 74 as above described.

Figure 5:
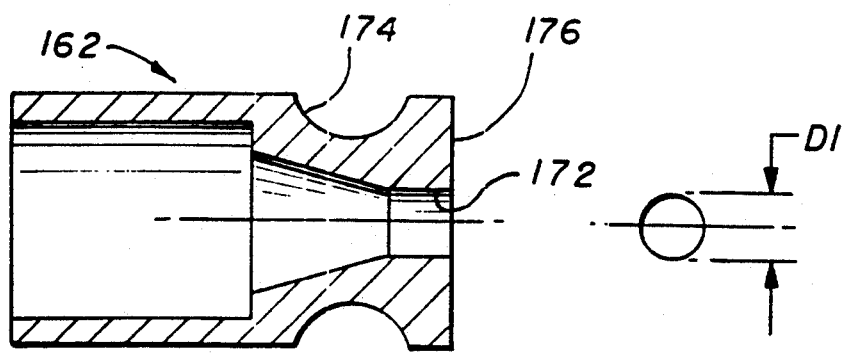
FIG. 5 is a cross sectional view of the nozzle of the jet level sensor.

As is shown in FIG. 5, the nozzle 162 includes an orifice 172 having a predetermined diameter D1. The nozzle 162 also defines a circumferential groove 174 displaced from the tip 176 which defines the orifice 172. The bracket 150 defines an opening 178 adjacent the first end 154 thereof. When the nozzle 162 is disposed within the first end 154 of the bore 152, the circumferential groove 174 is aligned with the opening 178 and a spring pin 180 is inserted therein to secure the nozzle 162 to the bracket 150 in such a manner that the conduit input tube assembly including the conduit 26 is free to rotate with respect to the bracket 150.

Figure 6:
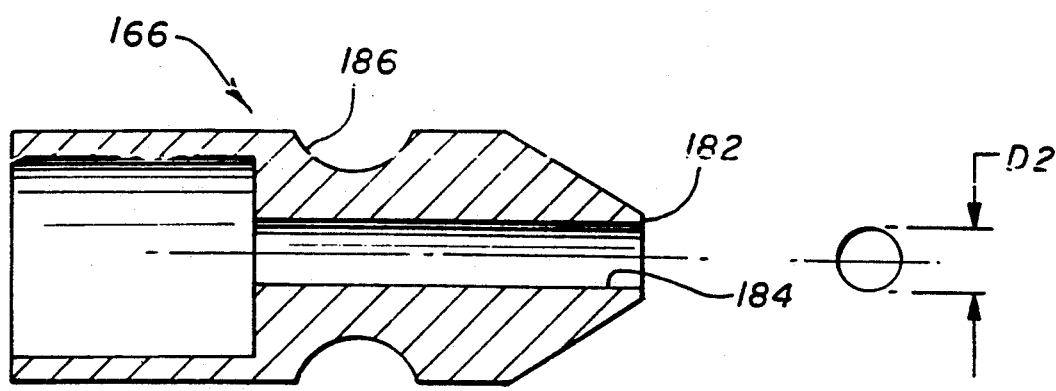
FIG. 6 is a cross sectional view of the receiver of the jet level sensor.

Referring now more specifically to FIG. 6, the receiver 166 is further illustrated. As is therein shown, the receiver 166 includes a tip 182 which defines an orifice 184 which has a second diameter D2. The receiver 166 also defines a circumferential groove 186. The bracket 150 defines an opening 188 adjacent the second end 156 thereof. When the receiver 166 is inserted into the second end 156 of the bore 152, the circumferential groove 186 is aligned with the opening 188 and a spring pin 190 is inserted therein to secure the outlet tube assembly including the conduit 170 to the bracket in such a manner that the conduit 170 is free to rotate with respect to the bracket 150.

Figure 7:
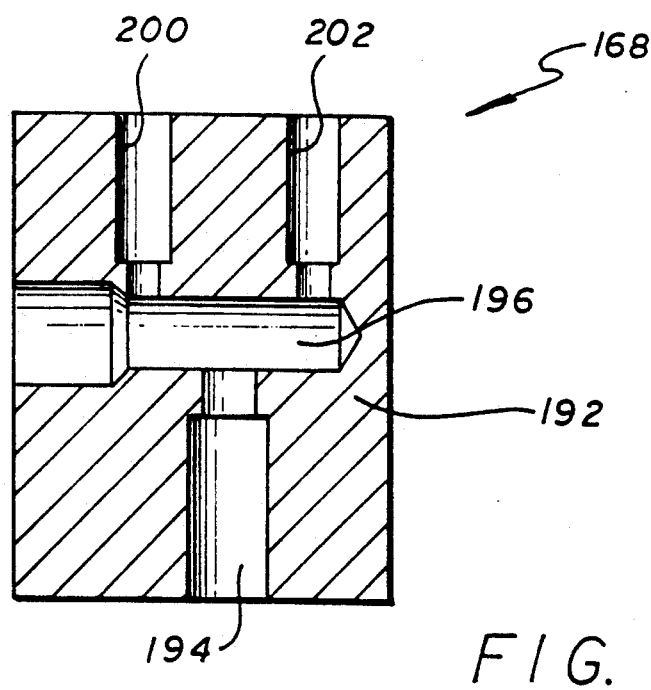
FIG. 7 is a cross sectional view of the manifold of the jet level sensor.

By referring now more particularly to FIG. 7, the manifold 168 is illustrated in further detail. As is therein shown, the manifold 168 includes a body 192 having an inlet 194 which terminates in a chamber 196 formed by a bore into the body 192 which, after assembly, is closed by a plug 198 (FIG. 4). A pair of outlets 200 and 202 communicate with the chamber 196 and receive the conduits 28 and 88. These conduits transmit the static pressure signals present at the receiver 166, in the absence of the liquid level within the tank being at the predetermined desired filled position, to the operating elements of the system such as the primary and secondary relays 72 and 74.

Through the construction of the jet level sensor 20 as above described, it will become apparent that the orifices 172 and 184 of the nozzle 162 and the receiver 166 are automatically aligned. This is accomplished through the nozzle and receiver being received in the opposite ends of the bore 152. By securing the inlet and outlet tube assemblies 160 and 164 to the bracket 150 in such a manner that there is freedom to rotate these assemblies with respect to the bracket, or alternatively, that the bracket is free to rotate with respect to the input and output tube assemblies, it becomes apparent that the various components of the sensor may be moved and positioned as desired at the time of installation with the remainder of the assembly in the particular installation of interest at the time.

By interrupting the bore 152 adjacent the receiver 166 as is illustrated at 158 in FIGS. 3 and 4, there is provided a shroud which effectively encircles the jet liquid stream emanating from the nozzle orifice 172. The shroud protects the jet stream from any splashing which might occur within the tank during filling thereof due to agitation of the fuel either by movement of the aircraft or entry of the fuel into the tank. To ensure entry of fuel into the space 68 and to assure shut-off of the jet liquid stream when the tank is filled, there is provided an additional opening 204 in the bracket and into the bore 152 adjacent to but spaced from the orifice 172 of the nozzle 162.

To assure a substantial recovery of the pressure present in the jet liquid stream, it is imperative that the stream impact the orifice 184 of the receiver 166. To assure such, the diameter D1 of the orifice 172 of the nozzle 162 is greater in diameter than is the diameter D2 of the orifice 184 of the receiver 166. That is, D1 is greater than D2 by an amount sufficient so that the receiver orifice is fully engulfed by the jet liquid stream when the liquid level in the tank is below the predetermined desired filled level thereof. It should also be noted as is shown in FIG. 6 that the outer edges adjacent the orifice 184 of the receiver 166 are tapered to eliminate or substantially mitigate any splash back which might occur from the jet liquid stream impacting the end 182 of the receiver 166. Although various tapers can be utilized, in the preferred embodiment an included angle of approximately 60° is preferred.

There has thus been disclosed a jet level sensor which is relatively inexpensive to manufacture, is easy to install and maintain, and provides effective and efficient operation.

What is claimed is:

1. A jet level sensor for detecting the level of liquid in a tank comprising:

(A) a nozzle including a tip defining an orifice having a first predetermined diameter;

(B) a receiver including a tip defining an orifice having a second predetermined diameter;

(C) first conduit means coupled to said nozzle for providing a jet liquid stream emanating from said nozzle;

(D) bracket means receiving said nozzle and said receiver in axially aligned spaced apart position;

(E) said second predetermined diameter being smaller than said first predetermined diameter so that said receiver orifice is fully engulfed by said jet liquid stream when said liquid level in said tank is below said sensor;

(F) a manifold coupled to said receiver;

(G) a plurality of conduit means coupled to said manifold for providing a plurality of output pressure signals from said sensor indicating that said tank liquid level is below said sensor; and (H) means for securing said nozzle to said bracket means so that at least said nozzle and said first conduit means are free to rotate with respect to said bracket means thereby to allow positioning of said bracket and said first conduit means at the time of installation of said jet level sensor to accommodate various applications of said jet level sensor.

2. A jet level sensor as defined in claim 1 wherein said nozzle defines a circumferential groove displaced from said tip, said bracket defines a first opening therethrough adjacent said nozzle and said first opening receives a first pin member which engages said nozzle circumferential groove.

3. A jet level sensor as defined in claim 1 which further includes a second conduit means coupling said receiver to said bracket means so that said receiver and said second conduit means are free to rotate with respect to said bracket means thereby to allow positioning of said bracket and said second conduit means at the time of installation of said jet level sensor to accommodate various applications of said jet level sensor.

4. A jet level sensor as defined in claim 3 wherein said receiver defines a circumferential groove displaced from the tip thereof, said bracket defines a second opening therethrough adjacent said receiver and said second opening receives a second pin member which engages said receiver circumferential groove.

5. A jet level sensor as defined in claim 1 wherein said bracket means includes a body defining a bore therethrough, said nozzle being received in one end of said bore and said receiver being received in the other end of said bore, said bore being interrupted adjacent said receiver orifice, said bore surrounding said jet liquid stream.

6. A jet level sensor as defined in claim 5 wherein said bore defines an opening adjacent said nozzle orifice for permitting entry of liquid from said tank into said bore to interrupt said jet liquid stream when liquid in said tank reaches a predetermined level.

7. A jet level sensor for detecting when liquid in a tank reaches a predetermined level comprising:
(A) bracket means including a body defining a bore therethrough, said bore having first and second ends and being interrupted adjacent said second end;
(B) a nozzle including a tip defining an orifice having a first predetermined diameter received within said first end of said bore;
(C) a receiver including a tip defining an orifice having a second predetermined diameter received within said second end of said bore, said orifice in said nozzle being in axial alignment with said receiver orifice;
(D) first conduit means coupled to said nozzle for providing a jet liquid stream emanating from said nozzle;
(E) said second predetermined diameter being smaller than said first predetermined diameter so that said receiver orifice is fully engulfed by said jet liquid stream when said liquid level in said tank is below said sensor;
(F) a manifold coupled to said receiver;
(G) a plurality of conduit means coupled to said manifold for providing a plurality of output pressure signals from said sensor indicating that said tank liquid level is below said sensor; and
(H) means for securing said nozzle to said bracket means so that at least said nozzle and said first conduit means are free to rotate with respect to said bracket means thereby to allow positioning of said bracket and said first conduit means at the time of installation of said jet level sensor to accommodate various applications of said jet level sensor.

8. A jet level sensor as defined in claim 7 wherein said nozzle defines a circumferential groove displaced from said tip, said bracket defines a first opening therethrough adjacent said nozzle and said first opening receives a first pin member which engages said nozzle circumferential groove.

9. A jet level sensor as defined in claim 8 which further includes a second conduit means coupling said receiver to said bracket means so that said receiver and said second conduit means are free to rotate with respect to said bracket means thereby to allow positioning of said bracket and said second conduit means at the time of installation of said jet level sensor to accommodate various applications of said jet level sensor.

10. A jet level sensor as defined in claim 9 wherein said receiver defines a circumferential groove displaced from the tip thereof, said bracket defines a second opening therethrough adjacent said receiver and said second opening receives a second pin member which engages said receiver circumferential groove.

* * * * *